Feb. 26, 1935.  T. M. ELFVING  1,992,745
ABSORPTION REFRIGERATING APPARATUS
Filed Feb. 8, 1932
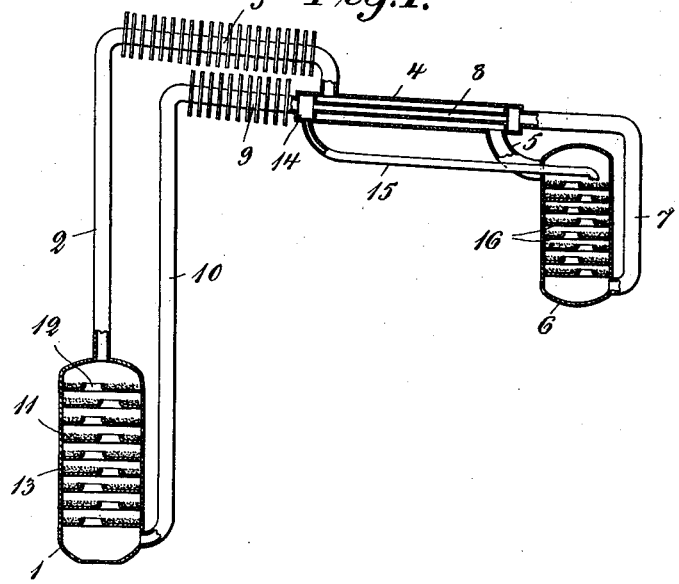
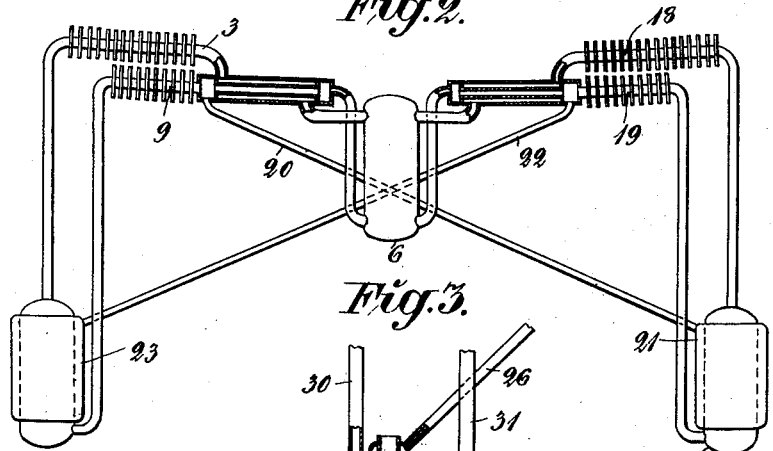
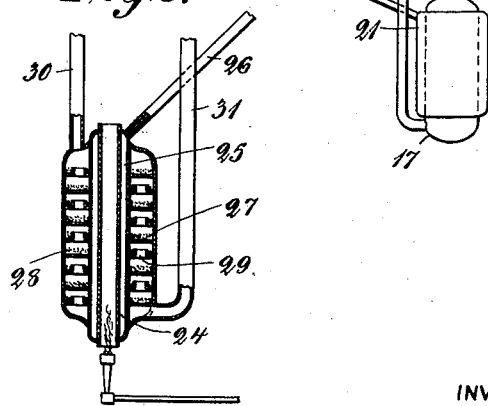
INVENTOR
THORE MARTIN ELFVING
BY Haseltine, Lake & Co.,
ATTORNEYS Patented Feb. 26, 1935

1,992,745

UNITED STATES PATENT OFFICE 1,992,745

ABSORPTION REFRIGERATING APPARATUS

Thore Martin Elfving, Stockholm, Sweden

Application February 8, 1932, Serial No. 591,600
In Sweden February 9, 1931

1 Claim. (Cl. 62—118)

The present invention relates to absorption refrigerating apparatus and particularly to such apparatus in which cooling effect is obtained by the evaporation of refrigerant in an atmosphere of inert gas. Hitherto known apparatus in which refrigerant is diffused into an inert gas circulating between the evaporator and the absorber, have been made continuously operating by arranging a circulation of liquid absorption means between the boiler and the absorber.

In the ordinary apparatus of this type the refrigerant is ammonia and the absorption means water. The inert gas is usually hydrogen. The presence of aqueous solutions in the apparatus presents, however, great inconveniences as corrosion in the apparatus gradually causes obstructions in the pump system. The dimensions of the pump spiral etc. must be kept comparatively narrow and the heat supply concentrated. Thereby the reliability of the apparatus is further reduced.

A further inconvenience is to be found in considerable rectifier losses. In apparatus using ammonia as a refrigerant and water as absorption means said losses may, in air cooled apparatus, exceed fifty per cent of the heat supplied to the boiler.

The present invention has for its object to eliminate said inconveniences in such apparatus by using solid absorption or adsorption means. This is rendered possible by disposing an evaporator and an absorber in a gas circulation circuit using solid absorption means capable of alternately absorbing and delivering refrigerant by the alternate cooling and heating of the absorber respectively. Condensers or the like are then disposed in said circulation circuit as will be more closely described in the following description. Such an apparatus must, of course, operate intermittently by alternate heating and cooling periods. The solid absorption means may consist of such substances as active carbon, calcium chloride, strontium chloride, silica gel, or a mixture of such materials which easily absorb a refrigerant, such as ammonia or the like. The inert gas may preferably consist of hydrogen. In the gas circulation system a heat exchanger will have to be disposed for eliminating the losses during the cooling period. The pressure in the apparatus will vary with the temperature of the systems and will thus during the expelling period be higher than during the cooling period. During the expelling period hydrogen will be compressed in the evaporator and the gas heat exchanger. During the cooling period the hydrogen will again fill out the entire system, the gas circulating between the evaporator and the absorber.

The invention has also for its object to bring about a continuously operating unit having solid absorption means. This is rendered possible by combining two systems each comprising an evaporator and an absorber forming a gas circulation circuit. The evaporator may preferably be common to both systems which can be in open communication with one another. By alternately supplying heat to the two absorbers the two systems will alternately deliver cooling effect so that the cooling periods immediately follow after one another. The one system will then during its heating period deliver refrigerant to the evaporator while in the other system the gas circulation transports refrigerant from the evaporator to the absorber, whereby cooling effect is obtained. During the alternate heating of the absorbers of the two systems the greater portion of the inert gas will be alternately displaced from the one system to the other, the pressure in the two systems always remaining the same. In the two gas circulation systems condensers and gas heat exchanges are disposed in a manner described in the following.

The invention will be more closely described with reference to the accompanying drawing on which Figure 1 shows an intermittent apparatus and Figure 2 shows a continuously operating unit being a combination of two such intermittent apparatus. Figure 3 shows an embodiment of the boiler-absorber.

The apparatus shown in Figure 1 consists of a boiler-absorber 1 from which a pipe 2 extends. On its upper portion 3 being inclined towards the evaporator, the pipe is provided with flanges and constitutes a condenser communicating with branch 4 of the gas heat exchanger. Said branch extends through the pipe 5 to the upper portion of the evaporator 6. The evaporator 6 communicates through pipe 7 with branch 8 of the heat exchanger, with which branch the pipe 9 and its extension 10 communicate. Said extension is connected to the lower portion of the boiler-absorber. The portion 9 inclined towards the evaporator is provided with flanges. The condensers 3 and 9 may, of course, also be cooled by cooling water although the apparatus shown on the drawing is assumed to be air cooled. The boiler-absorber is provided with disks 11 having apertures 12 with bent up edges. The holes are so disposed that the gas passing the boiler-absorber is compelled to make an intimate contact with the solid absorption material 13 stored on the disks. In the evaporator 6 there are also disks having similar apertures. From the condenser 9 close to its entrance 14 in the temperature exchanger the pipe 15 conducts liquid refrigerant from the condenser 9 to the evaporator.

The apparatus is assumed to be filled with refrigerant, such as ammonia, and an inert gas, such as hydrogen. The solid absorption means may be any one of the above mentioned substances. The apparatus operates in the following manner. It is assumed that the refrigerant to begin with is stored in the solid absorption means in the boiler-absorber. If now heat is applied to the boiler-absorber, refrigerant vapors are liberated and the hydrogen is compressed in the heat exchanger and the evaporator until a pressure equal to condensation temperature has been reached in the apparatus. The refrigerant vapors leaving through the pipes 2 and 10 will then be gradually condensed in the condensers 3 and 9 respectively. The liquid condensate runs down through the pipes 5 and 15 to the evaporator where it is stored on the disks 16. The heating of the generator-absorber continues until the greater portion of ammonia has been driven out of the absorption means and stored in the evaporator. Now the heat supply is cut off and the boiler-absorber is cooled. Upon cooling the absorption means the vapor pressure of the ammonia is reduced above said material and the absorption of the refrigerant vapors in the boiler-absorber begins. In the absorber there will thus remain practically pure hydrogen which is lighter than the mixture of hydrogen and refrigerant vapors in the pipe 10. This results in a gas circulation in similar manner as in previously known apparatus having circulating systems. Poor gas will enter into the upper portion of the evaporator and be enriched on ammonia in the evaporator and cooling effect is obtained in the evaporator which continues as long as the absorber is cooled and as long as the absorption means is capable of absorbing further refrigerant. During this cooling period gas-losses are substantially eliminated by the gas heat exchanger 4, 8. At the end of the cooling period most of the refrigerant is again absorbed in the boiler absorber The cooling is now cut off and heat again supplied to the boiler-absorber. In this manner heating and cooling periods succeed each other so that the conditions after each period are the same as the conditions at the end of the next preceding period of the same kind.

Figure 2 shows a unit according to this system which gives a continuous cooling effect. The apparatus consists of the boiler-absorber 1 which communicates with the evaporator 6 through a circulation system in the same maner as above described. The same evaporator 6 communicates also through a similar circulating system with the boiler-absorber 17. The generator-absorbers 1 and 17 are on their insides provided with disks on which solid absorption means is disposed in the same manner as above described. The gas pipes extending from the boiler-absorber 1 are formed in the same manner as before to condensers 3, 9. In the other circulating system there are to be found in similar manner the condensers 18, 19. From the condenser 9 a pipe 20 leads to the cooling pocket 21 surrounding the boiler-absorber 17. In similar manner a pipe 22 leads from the condenser 19 to the cooling pocket 23 surrounding the boiler-absorber 21. The apparatus is assumed as before to be filled with ammonia, hydrogen and solid absorption means in both boiler-absorbers.

It is initially assumed that cooling refrigerant is stored in the solid absorption means in the boiler-absorber 1. The apparatus operates now in the following manner. Heat is supplied to boiler-absorber 1 and ammonia is liberated from the absorption means compressing the hydrogen in the evaporator and the system belonging to the boiler-absorber 17. When condensing pressure is reached the refrigerant vapors are condensed in the condensers 3 and 9. Then liquid refrigerant partly runs down onto the evaporator disks and partly is conducted through the pipe 20 to the cooling pocket of the boiler-absorber 17. The gas circulation in the right hand system starts and the refrigerant running down into the evaporator evaporates and circulates to the absorber 17 while giving off cooling effect in the evaporator. Due to the absorption in the boiler-absorber 17 heat is released which is absorbed through evaporation of refrigerant in the cooling pocket 21. From the pocket refrigerant vapors return to the condenser 9 through the pipe 20 and is again condensed. The boiler-absorber 1 will therefore during its heating period supply ammonia both to the evaporator and to the cooling pocket surrounding the boiler-absorber of the other system which latter absorber thus will be automatically cooled without using complicated cooling devices or reversing devices for cooling liquid or the like. It should be noted that this cooling arrangement may be used independent of whether the two systems have a common evaporator or not.

Each circulating system is as shown in the figure provided with a gas heat exchanger to eliminate the gas losses. The cooling effect of the apparatus will depend upon the quantity of condensate running into the evaporator and it may thus be regulated by controlling the heat supply to the boiler-absorber in each moment. The expelling of refrigerant from the solid absorption material in the boiler-absorber 1 takes place under a steady rise of temperature therein. The expelling should therefore be discontinued when the temperature reaches a certain limit. The heat supply then has to be shifted over to the boiler-absorber 17 by means of an ordinary reversing device. After shifting over the heat supply to boiler-absorber 17 the gas circulation in this system will stop as the absorber and the pipes leading therefrom will be filled with refrigerant vapors. The conditions will be the same as during the former period and the evaporator will accordingly give off cooling effect as above described. The boiler-absorber 1 is during this period cooled by ammonia from the condenser 19. The evaporator will thus continually give off cooling effect only by alternately supplying heat to the two absorbers 1 and 17. The reversal of the heat supply to the boiler-absorbers may preferably be regulated by a thermostat device having thermostat bulbs on the two absorbers. These bulbs give the impulse for reversing the heat supply in the one or the other direction when a certain temperature difference between the bulbs is reached.

It is also conceivable to provide the two cooperating systems with a common gas heat exchanger and a common cooling system for the condensers.

In the above described apparatus also liquid absorption means may be used which, however, could not be stored on disks. The absorber should be so devised that the free liquid surface is adequate for obtaining good absorption. This can be done by providing nets acting as wicks and in which the capillary attraction distributes the liquid over a large surface. When using liquid absorption means the absorbers should preferably communicate with one another underneath the free liquid surface of the absorption means.

The boiler-absorber may preferably be designed according to Figure 3 showing a section through the same. The boiler absorber consists here of a central pipe 24 surrounded by the cooling pocket 25. Said pocket communicates through the pipe 26 with a condenser from which liquid refrigerant runs down into the cooling pocket. On the cooling pocket the disks 27 are disposed in heat conducting communication and adapted to carry the solid absorption means 28. The disks are provided with holes 29 so disposed above each other that the inert gas during its circulation through the absorber is brought into good contact with a large surface of absorption means. The boiler-absorber communicates through the pipes 30, 31 with the evaporator. Through this disposition a good heat conducting communication is obtained between the cooling pocket and the absorption material which is of great importance. The heat is supplied through the central pipe by the disposition of a gas burner or an electric heating element. An efficient heating of the absorption material is rendered possible without the necessity of heating the insulating mass surrounding the boiler absorber to the same temperature as the absorption agent. Said material has also during the cooling period through its immediate contact with the cooling pocket a lower temperature than the insulating mass surrounding the boiler-absorber. Hereby a very good efficiency is obtained.

I claim:

An intermittently operating absorption refrigerating apparatus, comprising a boiler-absorber, an evaporator, conduits arranged in two branches interconnecting the boiler-absorber and the evaporator providing open communication there-between and forming a circulating circuit, a quantity of inert gas within said circulating circuit, condensers interposed in said circulating circuit, and a heat exchanger interconnecting said conduit branches.

THORE MARTIN ELFVING.